April 11, 1939.   D. W. FLETCHER   2,153,796
VARIABLE HYDRAULIC TRANSMISSION GEARING
Filed Dec. 20, 1937   2 Sheets-Sheet 1
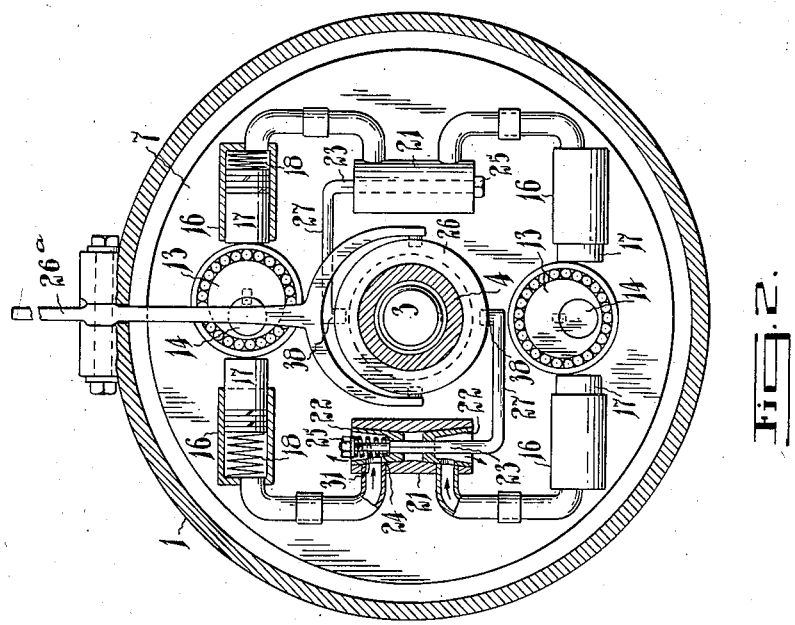
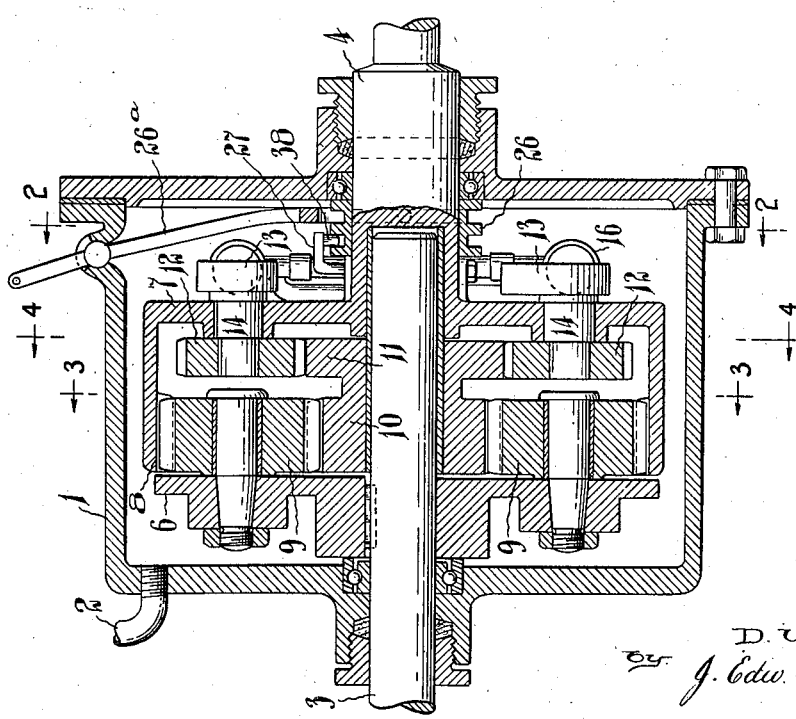
Inventor
D. W. Fletcher
by J. Edw. Maybee
ATTY April 11, 1939. D. W. FLETCHER 2,153,796
VARIABLE HYDRAULIC TRANSMISSION GEARING
Filed Dec. 20, 1937 2 Sheets-Sheet 2
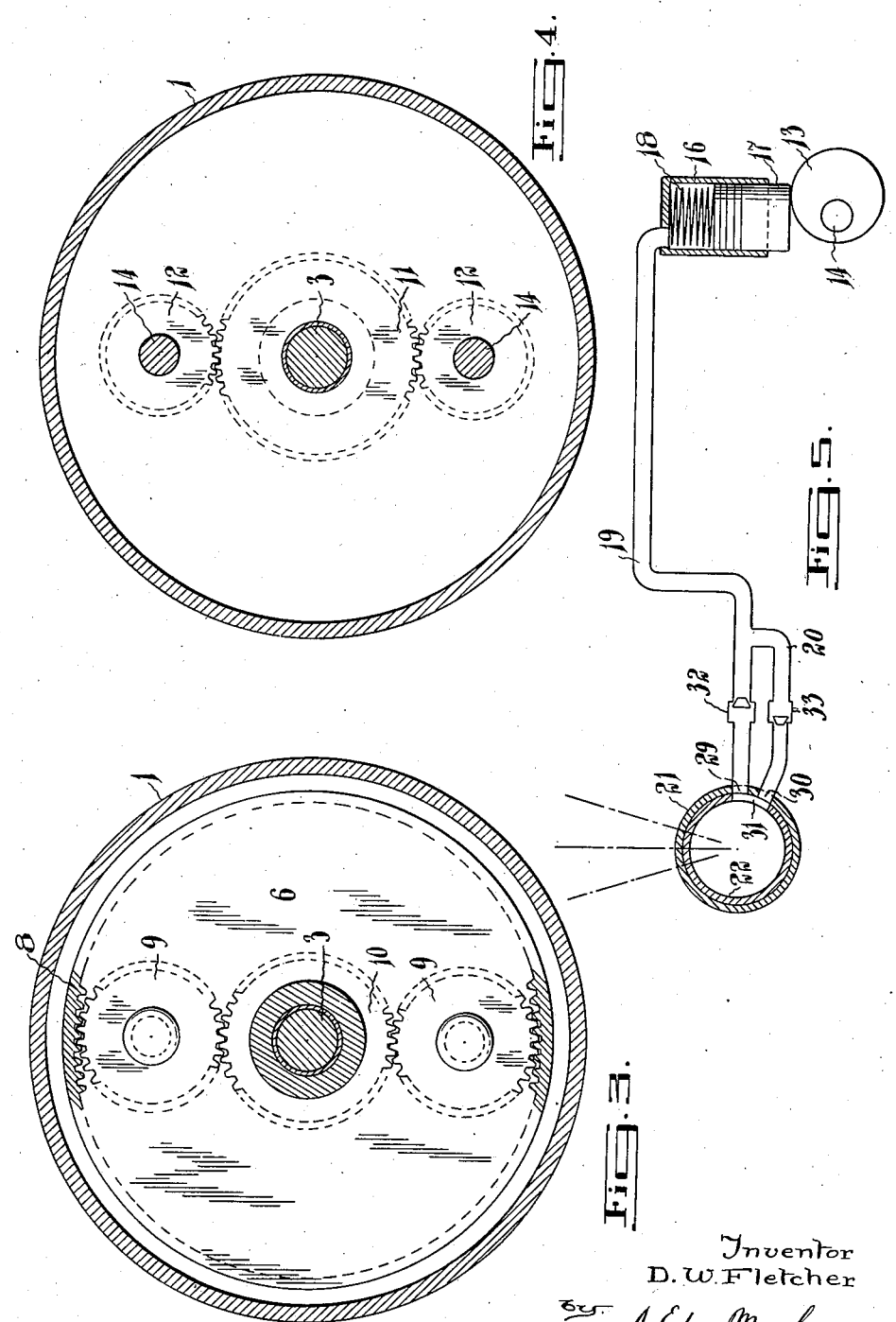
Inventor
D. W. Fletcher
by J. Edw. Maybee
ATTY.

Patented Apr. 11, 1939

2,153,796

UNITED STATES PATENT OFFICE 2,153,796

VARIABLE HYDRAULIC TRANSMISSION GEARING

Daniel Walter Fletcher, Toronto, Ontario, Canada, assignor to Flexi-Drive Limited, Toronto, Ontario, Canada Application December 20, 1937, Serial No. 180,762

5 Claims. (Cl. 74—294)

This invention relates to gears adapted to provide a variable speed transmission between driving and driven shafts, and my object is to provide a transmission gear in which variations in speed are obtainable by controlling the flow of liquid through a circulatory system in which the liquid is circulated by relative movement of the driving and driven shafts.

I attain my object by means of a construction which may be briefly described as follows.

A driving disk is secured to the driving shaft and a driven disk is secured to the driven shaft. To the driven disk is secured an internal gear ring which meshes with planet gears journalled on the driving disk, which planet gears mesh also with a sun gear free on the driving shaft.

Secured to the sun gear is a pump driving gear which meshes with one or more pump gears mounted on the driven disk and actuating one or more pumps also mounted on the driven disk.

The pumps are included in a circulatory system communicating with the interior of an oil containing gear case surrounding the mechanism. A valve is included in the circulatory system so that the flow may be controlled to resist more or less completely the rotation of the pump gears and thus either lock the driving and driven shafts together for direct drive or else permit more or less relative movement of the ring gear and driving disk and thus obtain speed variations from no drive to direct drive.

The invention also includes means for rendering the pumps entirely idle when the driving shaft is idling without load on the driven shaft.

The invention is hereinafter more fully described and is illustrated in the accompanying drawings in which Fig. 1 is a longitudinal section of my improved transmission gear;

Figs. 2, 3 and 4 are transverse sections on the lines 2—2, 3—3 and 4—4 respectively in Fig. 1; and Fig. 5 a diagram illustrating the construction and mode of operation of the liquid circulating system.

In the drawings like numerals of reference indicate corresponding parts in the different figures.

Referring particularly to Figs. 1 and 2, 1 is a casing which is stationary and may be supported in any suitable manner. This casing is filled with liquid usually an oil of low viscosity and is provided with the expansion line 2 which leads out of the upper side of the casing and will in practice be connected with a stationary expansion tank. It may thus be ensured that the casing will remain filled with the liquid.

Suitably mounted in the casing is the driving shaft 3, the inner end of which is sleeved within the inner end of the driven shaft 4 also journalled in suitable bearings on the casing 1.

6 is a driving disk keyed to the shaft 3. In automotive practice this disk could be the flywheel of the motor.

7 is a driven disk rigidly connected with the driven shaft 4. To this driven disk is secured the internal gear ring 8. Planet gears 9 journalled on the driving disk 6 mesh with the internal gear ring and also with the teeth of the sun gear 10, which is free on the driving shaft.

Secured to the sun gear 10 is the pump driving gear 11, which is preferably of greater diameter than the sun gear 10. This pump driving gear meshes with one or more pump gears 12 which are secured to spindles 14 journalled in the driven disk 7.

To the inner ends of the spindles 14 are secured the cams 13. These cams are provided with rings having ball bearings upon the body of the cam for the purpose of reducing friction. Mounted on the driven disk 7 are a plurality of pump cylinders 16. These are preferably four in number and are arranged in opposed pairs as shown particularly in Fig. 2 so that each cam 13 will drive or operate two pumps. With this arrangement the operations of the pumps overlap so as to provide a substantially constant flow when the pumps are in operation and the circulatory system is open as hereinafter referred to.

Each pump cylinder is provided with a piston 17. Each piston is pressed towards the adjacent cam by means of a spring 18 engaging the inner end of the cylinder and bearing against the inner end of the piston.

Also secured to the driven disk 7 are the valve casings 21 also arranged in connected pairs as shown in Fig. 2.

Referring particularly to Fig. 5, a single pump and valve with connecting conduits are seen. The valve casing is shown as having a valve plug 22 fitted therein, the said plug being open at one end to the interior of the casing 1 which, as hereinbefore stated, is filled with liquid. This plug is provided with the port 31. The casing 21 is provided with the ports 29 and 30 contiguous to one another. Forming a connection between the port 29 and the interior of the pump cylinder 16 is a main conduit 19.

In this conduit is positioned the check valve 32 intended to prevent back flow of liquid. A by-pass conduit 20 forms a communication between the port 30 and the main conduit 19 between the check valve 32 and the pump. In this by-pass is positioned a check valve 33, which permits back flow from the valve but resists outflow from the pump. The port 31 in the valve plug 22 is sufficiently long to extend over both the ports 29 and 30 so that the pump when in action can force liquid out through the check valve 32 and draw liquid in through the check valve 33 so that there is free circulation of the liquid. The ports are so proportioned and positioned that it is also possible to close the port 29 leaving the port 30 open and vice versa. The reason for this arrangement will hereinafter appear.

The specific valve construction is best shown in Fig. 2 of the drawings. It will be seen that two opposed valve plugs are coned to fit in a similar shaped double casing. One valve plug of each pair is secured to the spindle 23 on which the other is slidably and non-rotatably mounted as, for instance, by using the squared inner end on the spindle 23. A coil spring 24 is fitted within the hollow plug and bears against a shoulder formed therein and against the nut 25 secured to the end of the spindle 23, thus the plugs are held closely fitting their tapered seats by the action of the spring.

For operating purposes each spindle 23 has a rock arm 27 formed thereon which is provided with projections 38 fitting in a groove in the shifter ring 26 which is slidable longitudinally of the driven shaft 4. This shifter ring may be actuated by means of the forked shifter lever 26ᵃ which engages in the groove in the ring. This shifter lever extends through and is journalled on the casing 1, a part thereof extending outside the casing by means of which it may be operated to move the shifter ring 26 and thus actuate the rock arms 27 to rock the valve spindles 23.

The operation of the apparatus is substantially as follows. Initially the control valve would be in the position shown in Fig. 5 in which the pumps are adapted to freely circulate the liquid through the conduits to and from the reservoir formed by the casing 1. If now the drive shaft 3 is set in motion while the driven shaft 4 is stationary, the internal gear wheel will be held motionless. Therefore the planet gears which are being driven about the driving shaft 3 by the driving disk 6 are revolving owing to their mesh with the internal gear ring 8. This movement revolves the sun gear 10 which, in turn, drives the pump gearing revolving the pump cams which oscillate the pump plungers and thus effect the circulation of liquid referred to. If now the control valves be moved to more or less restrict the ports 29, the flow may be controlled to resist more or less completely the rotation of the pump gears. As the motion of the pump gears is lost, the movement is transmitted with great leverage across the planets to the internal ring which is forced to move. In a like manner by a further gradual restriction to the closed position the internal gear is forced to gain speed until a direct drive is secured between the main shafts. During this gradual restriction of the area of the port 29 the port 30 remains open so that there is free return permitted from the interior of the casing to the pump while resistance is provided to the movement of the liquid in the outgoing direction.

Ordinarily, as previously stated, when the gear is idling, that is, when the driving shaft is in motion and the driven shaft is still, both the ports 29 and 30 will be open, but the pumps will be in operation the cams being engaged by the pistons. To prevent such operation of the pumps and thus lessen friction when in the idling position it is merely necessary to move the valve plugs to close the ports 30, leaving the ports 29 open. Then as soon as a piston is lifted by a cam to the full extent of its inward motion it remains there since there is no backflow possible through the port 30. To restore the pump to working condition it is merely necessary to move the valve plug to a position to more or less completely uncover the port 30 when backflow takes place which permits the pump piston under the action of its spring to be forced to a position again for engagement with its cam.

No reverse gear is shown, but in practice any known form of reverse may be employed.

From the above description it will be seen that I have devised a gearing which will satisfactorily attain the objects of my invention as set out in the preamble to this specification.

What I claim as my invention is:

1. In variable speed gearing the combination of alined driving and driven shafts; a driving disk secured to the driving shaft; a driven disk secured to the driven shaft; an internal gear ring secured to the driven disk; planet gears journalled on the driving disk and meshing with the internal gear ring; a sun gear loose on the driving shaft and with which the planet gears mesh; a pump mounted on the driven disk; gearing whereby the pump is driven from the sun gear; a circulatory system in which the pump is included and carried by the driven disk; a reservoir of liquid with which the circulatory system is connected which also forms a casing for the gearing; and a valve controlling the flow in the system whereby more or less resistance may be provided to the relative movement of the ring and driving disk.

2. In variable speed gearing the combination of alined driving and driven shafts; a driving disk secured to the driving shaft; a driven disk secured to the driven shaft; an internal gear ring secured to the driven disk; planet gears journalled on the driving disk and meshing with the internal gear ring; a sun gear loose on the driving shaft and with which the planet gears mesh; a pump mounted on the driven disk; a pump gear journalled on the driven disk and adapted to actuate the pump; a pump driving gear secured to the sun gear and meshing with the pump gear; a circulatory system in which the pump is included and carried by the driven disk; a reservoir of liquid with which the circulatory system is connected; and a valve controlling the flow in the system whereby more or less resistance may be provided to the relative movement of the ring and driving disk.

3. In variable speed gearing the combination of alined driving and driven shafts; a driving disk secured to the driving shaft; a driven disk secured to the driven shaft; an internal gear ring secured to the driven disk; planet gears journalled on the driving disk and meshing with the internal gear ring; a sun gear loose on the driving shaft and with which the planet gears mesh; a pump mounted on the driven disk; a pump gear journalled on the driven disk and adapted to actuate the pump; a pump driving gear secured to the sun gear and meshing with the pump gear; a cam driven by the pump gear; a piston pump mounted on the driven disk and having its piston movable in one direction by the cam; means for effecting the return movement of the piston; a circulatory system in which the pump is included and carried by the driven disk; a reservoir of liquid with which the circulatory system is connected; and a valve controlling the flow in the system whereby more or less resistance may be provided to the relative movement of the ring and driving disk.

4. Variable speed gearing according to claim 3 in which the pump is single acting and the circulatory system includes a main conduit forming a communication between the pump and the reservoir; a check valve in said conduit to prevent back flow to the pump; a by-pass conduit connected with the main conduit between the said check valve and the pump; and a check valve in said by-pass to prevent outflow therethrough from the pump, the control valve being adapted to control said conduits to open both conduits simultaneously to the reservoir or to more or less shut off flow from the main conduit while leaving the by-pass open.

5. In variable speed gearing the combination of alined driving and driven shafts; a driving disk secured to the driving shaft; a driven disk secured to the driven shaft; an internal gear ring secured to the driven disk; planet gears journalled on the driving disk and meshing with the internal gear ring; a sun gear loose on the driving shaft and with which the planet gears mesh; a pump mounted on the driven disk; gearing whereby the pump is driven from the sun gear; a circulatory system in which the pump is included and carried by the driven disk; a reservoir of liquid with which the circulatory system is connected; and a valve controlling the flow in the system whereby more or less resistance may be provided to the relative movement of the ring and driving disk.

DANIEL W. FLETCHER.